United States Patent
Treichel et al.

(10) Patent No.: US 8,851,527 B2
(45) Date of Patent: *Oct. 7, 2014

(54) REUSABLE FITTING FOR TUBING

(75) Inventors: Steven A. Treichel, West Chester, PA (US); Mark A. Miller, Malvern, PA (US)

(73) Assignee: Omega Flex, Inc., Westfield, MA (US)

( * ) Notice: Subject to any disclaimer, the term of this patent is extended or adjusted under 35 U.S.C. 154(b) by 202 days.

This patent is subject to a terminal disclaimer.

(21) Appl. No.: 12/692,950

(22) Filed: Jan. 25, 2010

(65) Prior Publication Data

US 2010/0117358 A1    May 13, 2010

Related U.S. Application Data

(63) Continuation of application No. 11/166,537, filed on Jun. 24, 2005, now Pat. No. 7,677,609.

(60) Provisional application No. 60/582,904, filed on Jun. 25, 2004.

(51) Int. Cl.
| | |
|---|---|
| *F16L 19/08* | (2006.01) |
| *F16L 19/065* | (2006.01) |
| *F16L 25/00* | (2006.01) |

(52) U.S. Cl.
CPC ........... *F16L 25/0054* (2013.01); *F16L 19/065* (2013.01); *F16L 25/0036* (2013.01); *Y10S 285/903* (2013.01)
USPC ............ 285/322; 285/353; 285/382; 285/903

(58) Field of Classification Search
USPC ......... 285/331, 339, 903, 382, 353, 354, 386, 285/387, 389, 322
See application file for complete search history.

(56) References Cited

U.S. PATENT DOCUMENTS

| | | |
|---|---|---|
| 840,220 A | 1/1907 | Kane |
| 2,503,169 A | 4/1950 | Phillips |
| 4,345,805 A | 8/1982 | Finley et al. |
| 5,080,405 A | 1/1992 | Sasa et al. |
| 5,423,578 A | 6/1995 | Kanomata et al. |
| 6,036,237 A | 3/2000 | Sweeney |
| 6,276,728 B1 | 8/2001 | Treichel |
| 6,502,866 B1 | 1/2003 | Hujisawa et al. |
| 6,764,107 B1 | 7/2004 | Obahi et al. |
| 7,677,609 B2 * | 3/2010 | Treichel et al. ............... 285/322 |

FOREIGN PATENT DOCUMENTS

| | | |
|---|---|---|
| CN | 1249806 | 4/2000 |
| EP | 0023853 A1 | 2/1981 |
| JP | 3194286 A | 8/1991 |

OTHER PUBLICATIONS

European Search Report for International Application No. PCT/US2005022869, Nov. 18, 2010, 3 pages.

* cited by examiner

*Primary Examiner* — James Hewitt
(74) *Attorney, Agent, or Firm* — Cantor Colburn LLP

(57) ABSTRACT

A fitting for use with corrugated tubing, the fitting comprising: a nut having a passage therethrough for receiving the tubing, the tubing being corrugated tubing having a series of peaks and valleys; a plurality of retainers positioned forward of the nut, the retainers having a sealing surface for placement in a valley of the corrugated tubing; a body having an annular pocket formed circumferentially around the retainers, the body having a body sealing surface, wherein upon sealing, the tubing is compressed between the sealing surface and the body sealing surface; a spring positioned within a cavity in the retainers, the spring driving the retainers into the pocket when the fitting is not sealed.

7 Claims, 3 Drawing Sheets

REUSABLE FITTING FOR TUBING

CROSS-REFERENCE TO RELATED APPLICATIONS

This application is a continuation of U.S. patent application Ser. No. 11/166,537, filed Jun. 24, 2005, now U.S. Pat. No. 7,677,609 the entire contents of which are incorporated herein by reference, which claims the benefit of U.S. provisional patent application Ser. No. 60/582,904, filed Jun. 25, 2004, the entire contents of which are incorporated herein by reference.

BACKGROUND

The flexible gas piping (FGP) system, also referred to as corrugated stainless steel tubing (CSST) and formerly Interior Gas Piping (IGP) was developed in Japan and first introduced into that market by Osaka Gas and Tokyo Gas Companies during the early 1980's. The system utilizes stainless steel corrugated tubing supplied in rolls or coils with field attachable fittings to distribute gas from a central supply point such as the meter or regulator to the various appliances within a house or building. The technology, which has likened the process of plumbing a house for gas to wiring a house for electricity, substantially reduces installation time and hence the associated higher cost of labor. The technology was brought to the United States by the Gas Research Institute who saw it as a means of making gas installations more competitive; thereby increasing the percentage of new construction plumbed for gas and increasing the overall consumption of natural gas on a national basis. The technology was enthusiastically endorsed and supported by major gas utilities who had seen the significant higher cost of installed piping as their single greatest obstacle to selling more gas. Code acceptance required more time and effort to obtain, but the product is now recognized by all national model codes and ANSI, the National Fire Protection Association/National Fuel Gas Code and is tested and recognized by the American Gas Association. This product will eventually supplant black-iron pipe which accounts for approximately 80% of all fuel gas piping today, as well as copper tube which, while enjoying many of the same advantages of FGP, is being banned from this application at an increasing rate.

There have been multiple types of fittings put into the field. One fitting introduced into the field used a fiber gasket to make the seal and no special tools were needed to assemble this fitting. This fitting has a higher incidence of leaks than the flared metal to metal seals used by other manufacturers.

Another fitting introduced into the field used first a specialized tool to flatten the convolutions at the end of the CSST tube where the fitting was to be attached and then a second tool was used to put a single flare on the tube end. This product is now off the market due to failures in the tubing caused by work hardening of the stainless steel in the flattening and flaring process.

Another type of fitting was introduced into the field using no special tools to make a metal to metal seal by folding the convolutions of the tube back on itself creating a double flare. After a limited time in the field it was realized that this fitting design was inconsistent in making a leak tight seal. The remedy to the problem was to design an insert type flaring tool; this was used for about three years. A second redesign was conducted, upgrading the insert tool to a socket type flaring tool.

Other fittings have been introduced by the Assignee of the present application and are discussed in U.S. Pat. Nos. 6,276, 728, 6,079,749, 5,799,989, the contents of all these patents being incorporated herein by reference in their entirety. While these fittings are well-suited for their intended purposes, improvements may be made in certain aspects of these fittings.

SUMMARY

Embodiments of the invention include a fitting for use with corrugated tubing, the fitting comprising: a nut having a passage therethrough for receiving the tubing, the tubing being corrugated tubing having a series of peaks and valleys; a plurality of retainers positioned forward of the nut, the retainers having a sealing surface for placement in a valley of the corrugated tubing; a body having an annular pocket formed circumferentially around the retainers, the body having a body sealing surface, wherein upon sealing, the tubing is compressed between the sealing surface and the body sealing surface; a spring positioned within a cavity in the retainers, the spring driving the retainers into the pocket when the fitting is not sealed.

BRIEF DESCRIPTION OF THE DRAWINGS

Referring now to the drawings wherein like elements are numbered alike in the several Figures.

DETAILED DESCRIPTION

Figure 1:
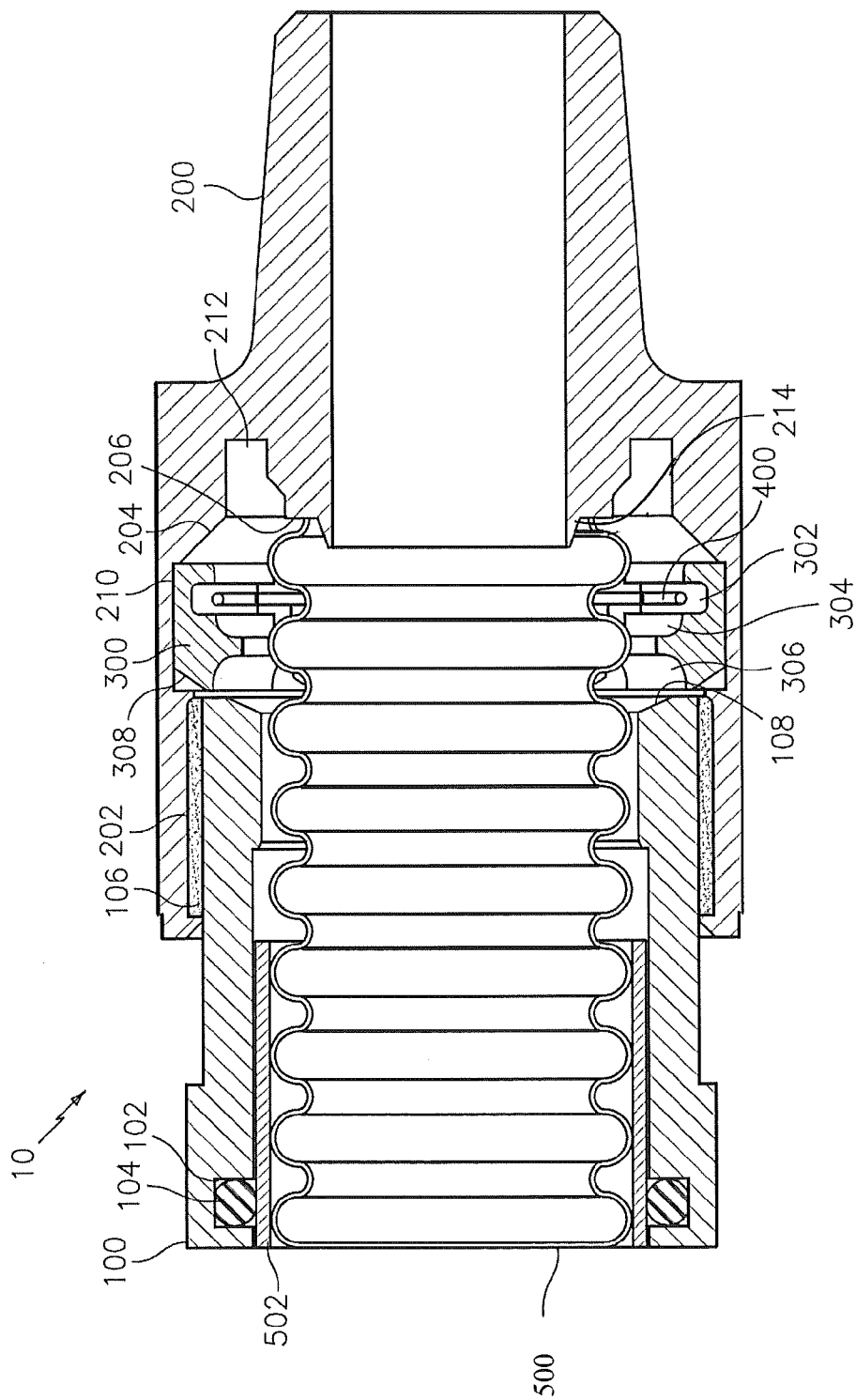
FIG. 1 is a cross-sectional view of an exemplary fitting in an assembled, unsealed state.

FIG. 1 is a cross-sectional view of a fitting 10 in an embodiment of the invention. Fitting 10 includes a nut 100, a body 200, retainers 300 and spring 400. FIG. 1 shows fitting 10 in an open, partially assembled position. The nut 100 and body 200 may be made from metal (e.g., brass) and machined or cast. Tubing 500 may be corrugated stainless steel tubing (CSST) or other corrugated tubing. In FIG. 1, the fitting is assembled, but not sealed.

Tubing 500 is shown positioned in the nut 100 and body 200. Tubing 500 is annular corrugated tubing having an exterior surface having peaks and valleys. Nut 100 includes a groove 102 and seal 104 (e.g., o-ring) at a first, rearward end to seal against a jacket 502 on tubing 500 as described in U.S. Pat. No. 6,695,353, the entire contents of which are incorporated herein by reference. The O-ring 104 resists entrance of foreign material into the fitting.

Nut 100 includes external threads 106 that engage internal threads 202 on body 200. As described in further detail herein, nut 100 includes a nut surface 108 at a second, forward end on which retainer surface 308 rides when the body 200 and nut 100 are tightened. Similarly, body 200 includes a body surface 204 on a second, forward end, on which retainers 300 ride when the body 200 and nut 100 are tightened.

Retainers 300 include a cavity 302 positioned at a front face of retainer 300 for containing spring 400. Retainers 300 include sealing surface 304 behind cavity 302. As described in further detail herein, corrugated tubing is compressed between sealing surface 304 and body sealing surface 206. A retainer rear cavity 306 at a first, rearward end of retainer 300, receives a peak of the tubing 500 when the fitting is tightened.

When disassembled or in a partially assembled state, the spring 400 drives retainers 300 into a pocket 210 formed in body 200 circumferentially around the retainers 300. This moves the retainers 300 and spring 400 outside of the outer diameter of tubing 500 to allow for assembly and disassembly. The tubing 500 may be freely inserted into or removed from the nut when the retainers 300 are in pocket 210. Thus, the fitting 10 may be reused.

In the partially assembled state shown in FIG. 1, the body 200 engages the nut 100 but threads 106 and 202 are not fully engaged. Retainers 300 are pushed into pocket 210 by spring 400. Tubing 500 is inserted into the fitting until it contacts body sealing surface 206 at the second, forward end of body 200.

Figure 2:
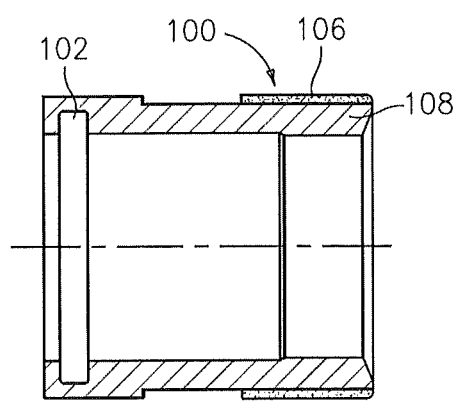
FIG. 2 is a cross-sectional view of an exemplary nut.

FIG. 2 is a cross-sectional view of nut 100. As noted above, the nut 100 includes nut surface 108 at a second, forward end of the nut 100. The nut surface 108 is angled at an oblique angle less then 90 degrees relative to a longitudinal, central axis of the fitting 10. This angle is mirrored on retainer surface 308 on the first, rearward end of retainer 300.

Figure 3:
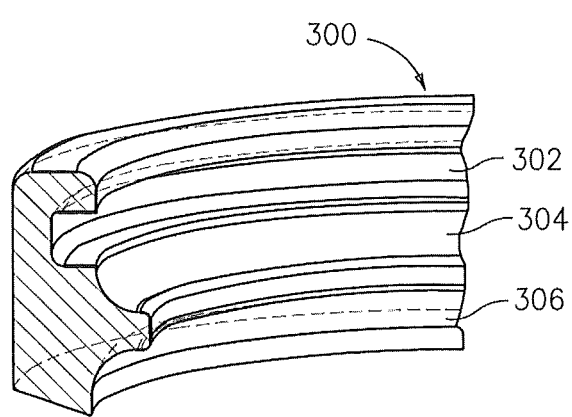
FIG. 3 is a perspective view of an exemplary retainer.

FIG. 3 is a perspective view of a retainer 300. The fitting includes a plurality of retainers and may have three or more retainers. Spring 400 is received in cavity 302 to be positioned outside the outer diameter of the tubing 500 when the fitting is not sealed. In exemplary embodiments, three retainers are used, each spanning 120 degrees of the tubing. When the fitting is sealed, the three retainers abut at their ends, to form a continuous retainer ring. Sealing surface 304 compresses one or more convolutions of tubing 500 against body sealing surface 206 to form a metal-to-metal seal.

Figure 4:
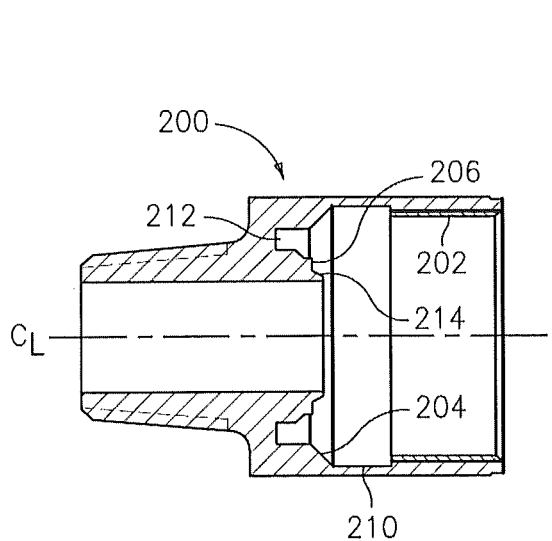
FIG. 4 is a cross-sectional view of an exemplary body.

FIG. 4 is a cross-sectional view of the body 200. Body 200 includes an annular recess 212 extending towards a first, rearward end of body 200. Recess 212 receives a forward portion of the retainers 300 when the fitting is assembled. Body 200 includes a tapered surface 214 that serves as a pilot to align the body 200 with tubing 500. The tapered surface 214 is at an oblique angle with reference to a centerline of the fitting. Tapered surface 204 is also angled relative to body sealing surface 206, which is shown as perpendicular to the centerline of the body 200.

Figure 5:
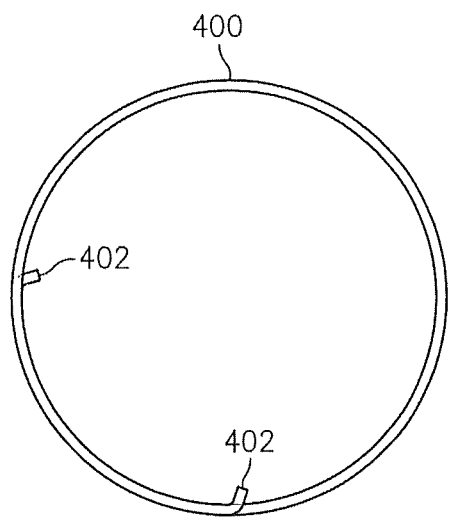
FIG. 5 is a plan view of an exemplary spring.

FIG. 5 depicts spring 400. Spring 400 is a wire spring coiled to a rest state having a diameter greater than the outer diameter of the tubing 500. Tabs 402 on the spring ends are bent inward to prevent spring 400 from jamming on the surface of retainers 300. When the fitting 10 is unassembled or partially assembled as shown in FIG. 1, spring 400 forces the retainers outward in a radial direction to position retainers 300 within pocket 210. Retainers 300 will stay in place in pockets 210 in the open position even if the fitting is dropped or jarred. As the body 200 is tightened to the nut 100, retainers 300 move inward in a radial direction compressing spring 400. The inward motion of retainers 300 is driven by angled nut surface 108 and angled body surface 204, both of which form an oblique angle with reference to centerline of the fitting 10.

Figure 6:
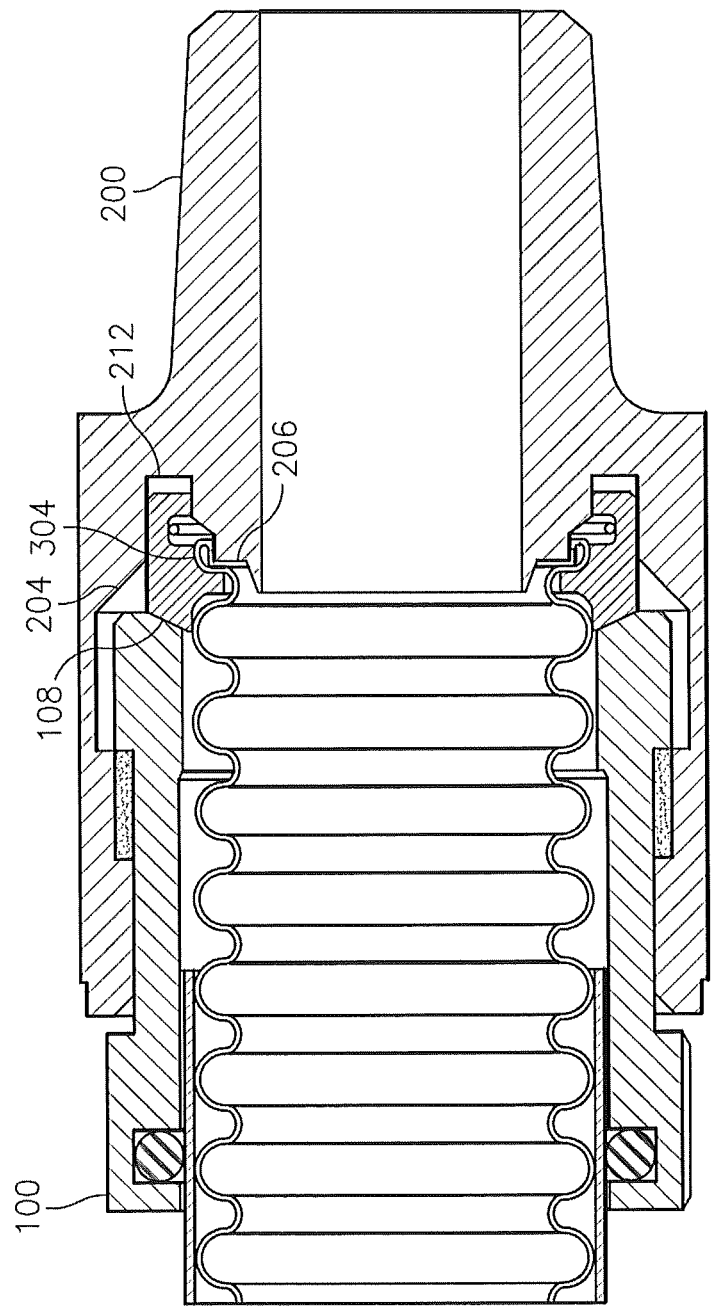
FIG. 6 is a cross-sectional view of an exemplary fitting in an assembled, sealed state.

FIG. 6 depicts fitting 10 in a sealed state. As body 200 is tightened on nut 100, the retainers 300 are driven radially inward through interaction with surfaces 108 and 204 as the nut 100 moves towards body 200. This causes the sealing surface 304 to be placed in a valley behind one or more peaks of corrugated tubing 500. As the nut 100 and body 200 are further tightened, retainers 300 enter recess 212. As the nut 100 enters body 200, the first convolution of the tubing 500 is compressed between sealing surface 304 and body sealing surface 206. This forms a metal-to-metal seal between the body 200 and tubing 500 and between the retainers 300 and the tubing 500. The seal is such that the outer diameter of the seal is equal to or not substantially greater than the outer diameter of the tubing 500. This allows the tubing to be removed from nut 100 when the nut 100 and body 200 are loosened.

Sealing surface 304 is shaped to closely match the corrugation geometry on tubing 500 and requires less force to make up. The resulting seal from sealing surface 304 is not a flare and does not extend beyond tubing outer diameter. Sealing surface 304 reduces applied stress to the tubing 500 as compared to conventional flares. Body sealing surface 206 is a line seal for greater reliability If the nut 100 is loosened from the body 200, spring 400 drives the retainers 300 radially outward until the sealing surface 304 clears the outer diameter of the tubing 500. The tubing 500 may then be removed. This allows the fitting 10 to be reused.

A fitting according to exemplary embodiments of the invention provides numerous advantages. The push-on design (i.e., the fitting can be pushed over tubing 500) does not require disassembly and is reusable. Fitting 10 is staked to prevent disassembly and can be made from a wide range of materials.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fitting for use with corrugated tubing, the fitting comprising:
    a nut having a passage therethrough for receiving the tubing, the tubing being corrugated tubing having a series of peaks and valleys;
    a plurality of retainers the retainers having a sealing surface for placement in a valley of the corrugated tubing;
    a body having an annular pocket formed circumferentially around the retainers, the body having a linear body sealing surface, wherein upon sealing of the tubing to the fitting, the tubing is compressed between the sealing surface and the body sealing surface; and
    a spring positioned within the retainers, the spring driving the retainers into the pocket when the fitting is not sealed;
    wherein the nut includes a nut surface, the nut surface engaging a retainer surface on the retainer to direct the retainer towards a centerline of the fitting upon engagement of the nut and body;
    wherein the body includes a tapered body surface, the body surface engaging the retainer to direct the retainer towards a centerline of the fitting during engagement of the nut and body, the body surface being separate from the body sealing surface.

2. The fitting of claim 1 wherein:
    the nut surface has an oblique angle less than 90 degrees with respect to the centerline of the fitting.

3. The fitting of claim 2 wherein:
    the oblique angle is mirrored on the retainer surface.

4. The fitting of claim 1 wherein:
    the retainers include a rear retainer cavity opposite the sealing surface, the rear retainer cavity receiving a peak of the corrugated tubing.

5. The fitting of claim 1 wherein:
    the body sealing surface is substantially perpendicular to a centerline of the fitting.

6. The fitting of claim 1 wherein:
the body includes a tapered surface at a forward end of the body, the tapered surface providing a pilot surface to align the tubing with the body.

7. The fitting of claim 1 wherein:
the nut includes exterior threads that engage threads formed on an interior of the body.

\* \* \* \* \*